United States Patent
Deisch

(10) Patent No.: US 9,502,992 B2
(45) Date of Patent: Nov. 22, 2016

(54) DIODE SUBSTITUTE WITH LOW DROP AND MINIMAL LOADING

(75) Inventor: Cecil W. Deisch, Warrenville, IL (US)

(73) Assignee: CORIANT OPERATIONS, INC., Naperville, IL (US)

(*) Notice: Subject to any disclaimer, the term of this patent is extended or adjusted under 35 U.S.C. 154(b) by 784 days.

(21) Appl. No.: 13/486,775

(22) Filed: Jun. 1, 2012

(65) Prior Publication Data

US 2013/0322143 A1    Dec. 5, 2013

(51) Int. Cl.
*H02M 3/335* (2006.01)
*H02M 7/217* (2006.01)

(52) U.S. Cl.
CPC ................................. *H02M 7/217* (2013.01)

(58) Field of Classification Search
CPC .. H02M 7/06; H02M 7/34; H02M 2001/322; H02M 2001/325; H02M 2007/217; H02M 3/335
USPC .................................................. 363/126, 127
See application file for complete search history.

(56) References Cited

U.S. PATENT DOCUMENTS

| | | | | |
|---|---|---|---|---|
| 3,924,154 A * | 12/1975 | Minks | .................... | H02J 7/1492 315/310 |
| 4,059,792 A | 11/1977 | Etter et al. | .................... | 363/135 |
| 4,542,349 A * | 9/1985 | Hoeft | .................... | 330/279 |
| 4,573,022 A * | 2/1986 | Koga | .................... | H03F 1/083 330/261 |
| 4,857,766 A * | 8/1989 | Pricer | .................... | H03K 19/09448 326/30 |
| 5,119,283 A | 6/1992 | Steigerwald et al. | .................... | 363/37 |
| 5,168,243 A * | 12/1992 | Feliz | .................... | H03F 3/45479 330/252 |
| 5,303,138 A | 4/1994 | Rozman | .................... | 363/21 |
| 5,416,388 A | 5/1995 | Shackle | .................... | 315/219 |
| 5,528,482 A | 6/1996 | Rozman | .................... | 363/21 |
| 5,572,114 A * | 11/1996 | Ichimaru | .................... | G05F 3/262 323/315 |
| 5,587,895 A * | 12/1996 | Harkins | .................... | 363/89 |
| 5,872,705 A | 2/1999 | Loftus, Jr. et al. | .................... | 363/21 |
| 5,936,392 A * | 8/1999 | Taylor | .................... | G05F 3/267 323/315 |
| RE36,571 E | 2/2000 | Rozman | .................... | 363/21 |
| 6,215,330 B1 * | 4/2001 | Notthoff | .................... | 326/130 |
| 6,310,466 B1 | 10/2001 | Criscione | .................... | 323/222 |
| 6,442,047 B1 | 8/2002 | Cohen | .................... | 363/17 |
| RE37,889 E | 10/2002 | Rozman | .................... | 363/21.06 |
| 6,597,587 B1 | 7/2003 | Poon et al. | .................... | 363/21.06 |
| 6,680,651 B2 * | 1/2004 | Kim | .................... | 330/288 |
| 7,088,602 B2 | 8/2006 | Priegnitz et al. | .................... | 363/127 |
| 7,224,146 B2 | 5/2007 | Poore et al. | .................... | 322/28 |
| 7,409,820 B2 | 8/2008 | Ahrendt | .................... | 60/226.2 |
| 7,542,315 B2 | 6/2009 | DeVilbiss | .................... | 363/84 |
| 7,724,550 B2 | 5/2010 | Bohm et al. | .................... | 363/48 |

(Continued)

FOREIGN PATENT DOCUMENTS

| | | |
|---|---|---|
| CA | 1060095 A1 | 8/1979 |
| CA | 2 590 627 A1 | 6/2006 |

(Continued)

*Primary Examiner* — Yemane Mehari
(74) *Attorney, Agent, or Firm* — Fitzpatrick, Cella, Harper & Scinto

(57) ABSTRACT

A voltage rectifier circuit having a storage element and a switching stage that is switchable to enable the storage element to capture a peak voltage of an alternating power source. The switching stage includes transistors arranged in a back-to-back configuration. In one example, the storage element is a capacitor and the transistors are PNP bipolar junction transistors. The configuration of the circuit enables reduced loading on the power source, as well as reduced sensitivity to temperature.

23 Claims, 2 Drawing Sheets

(56) References Cited

U.S. PATENT DOCUMENTS

| | | |
|---|---|---|
| 7,746,042 B2 | 6/2010 | Williams et al. ............. 323/223 |
| 7,751,212 B2 | 7/2010 | Perkinson .................... 363/127 |
| 7,834,367 B2 | 11/2010 | Parikh et al. ................... 257/94 |
| 8,018,696 B2 | 9/2011 | Ahrendt .......................... 361/33 |
| 8,254,152 B2 | 8/2012 | Wang et al. ................... 363/127 |
| 8,344,398 B2 | 1/2013 | Parikh et al. ................... 257/94 |
| 8,344,646 B2 | 1/2013 | Xue et al. ..................... 315/291 |
| 8,564,020 B2 | 10/2013 | Chen et al. ................... 257/194 |
| 8,570,770 B2 | 10/2013 | Eisenbeis et al. ......... 363/21.07 |
| 2012/0248986 A1 | 10/2012 | Gibbs ........................... 315/122 |
| 2013/0107583 A1 | 5/2013 | Seok ......................... 363/21.12 |
| 2013/0249529 A1 | 9/2013 | Seok ............................ 323/364 |
| 2013/0333741 A1 | 12/2013 | Doutreloigne et al. ...... 136/244 |

FOREIGN PATENT DOCUMENTS

| | | |
|---|---|---|
| CN | 202918210 U | 5/2013 |
| DE | 103 37 271 A1 | 3/2005 |
| EP | 0 543 005 A1 | 5/1993 |
| EP | 0 622 891 A2 | 11/1994 |
| EP | 1 052 763 A1 | 11/2000 |
| EP | 1 067 662 A1 | 1/2001 |
| EP | 1 229 635 A2 | 8/2002 |
| EP | 1 351 373 A1 | 10/2003 |
| EP | 1 772 958 A2 | 4/2007 |
| EP | 1 947 700 A2 | 7/2008 |
| EP | 1 988 273 A2 | 11/2008 |
| EP | 2 080 260 A1 | 7/2009 |
| EP | 2 291 664 A2 | 3/2011 |
| EP | 2 298 029 A2 | 3/2011 |
| EP | 2 651 035 A1 | 10/2013 |
| WO | 92/22952 A1 | 12/1992 |
| WO | 95/16337 A1 | 6/1995 |
| WO | 01/28079 A2 | 4/2001 |
| WO | 2008/067542 A2 | 6/2008 |
| WO | 2008/134206 A2 | 11/2008 |
| WO | 2010/030400 A1 | 3/2010 |

\* cited by examiner

DIODE SUBSTITUTE WITH LOW DROP AND MINIMAL LOADING

BACKGROUND

Field

Example aspects described herein relate generally to voltage rectifier circuits, and more particularly, to methods, apparatuses and systems that employ a voltage rectifier circuit having a low-drop diode substitute with minimal loading, to capture the peak voltage of an alternating current source.

Description of the Related Art

FIG. 1 shows a circuit 101 that is used to capture the positive peak voltage of an alternating current (AC) source 102. The output current of the AC source 102, which has certain source impedance 106, is converted to direct current by a diode 103. The output voltage of the diode 103 is captured by a capacitor 105, which is slowly dissipated by a high-value resistor 104 when the output voltage of the AC source 102 is low or zero.

The circuit 101 has some limitations. First, the diode 103 has a significant voltage drop which can be problematic when the AC signal is in the low-volts range. Because of this, voltage Vout is approximately equal to the peak voltage of the AC source 102 minus the diode voltage drop. For a PN silicon diode, the voltage drop is about 0.7 volts. Assuming that the AC source 102 has a peak voltage of about 3 volts, this voltage drop can lead to a deviation from the peak voltage of about 23%. Second, this voltage drop varies with temperature. Even the voltage drop for a Schottky diode, which is generally smaller than 0.7 volts, is temperature dependent. Third, the source impedance 106 preferably must be kept quite low such that when diode 103 conducts during the peak voltage and the peak current is high, the voltage drop across the source impedance 106 also degrades voltage Vout. However, keeping the source impedance low often is difficult or expensive to do.

Resistor 104 generally has a high resistance value to slowly "bleed down" the capacitor 105 when the AC source 102 voltage is low or zero. As a result, during the peak input voltage, a current surge must supply all the charge drained away by resistor 104 during the non-peak time.

SUMMARY

The above and other limitations are overcome by a voltage rectifier circuit constructed and operated according to example aspects herein. In one example, the circuit can capture the peak voltage of an alternating current (AC) source, maintains a low voltage drop from the AC source and provides minimal loading on the AC source.

In one example embodiment herein, the circuit comprises a storage element (e.g., a capacitor), and a switching stage that is switchable to enable the storage element to capture a peak voltage of an alternating power source. The switching stage includes transistors arranged in a back-to-back configuration. In one example embodiment, the transistors are bipolar junction PNP transistors, emitters of the transistors are connected together, and a base of a first one of the transistors is connected with the alternating power source. Also in one example, a base and a collector of a second of the transistors are connected together.

In one example embodiment, the circuit further comprises a resistor connected in parallel with the storage element, and further comprises a voltage source connected with the emitters. Also, a base and a collector of one of the transistors are connected with the storage element and the resistor.

Preferably, an output current of one the transistors is set to be a peak current of the alternating power source.

In still a further example embodiment herein, the transistors are identical, and include a plurality of transistors.

In another example embodiment herein, the transistors include four transistors,

Transistors of a first pair of the four transistors are identical with one another, and transistors of a second pair of the transistors are identical with one another.

In still a further example embodiment herein, at least one of temperature coefficients and voltage drops across the transistors essentially cancel out, and the circuit provides minimal loading on the alternating power source.

BRIEF DESCRIPTION OF THE DRAWINGS

The teachings claimed and/or described are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

It should be noted that different ones of the Figures may include the same reference numerals to identify the same components, and thus a description of each such component may not be provided herein with respect to each particular Figure.

DETAILED DESCRIPTION

The present application presents several novel and inventive example approaches for, among other things, capturing the peak positive voltage of an alternating current (AC) source, with low voltage drop from the AC source and minimal loading on the AC source, and providing a corresponding DC output voltage.

Figure 1:
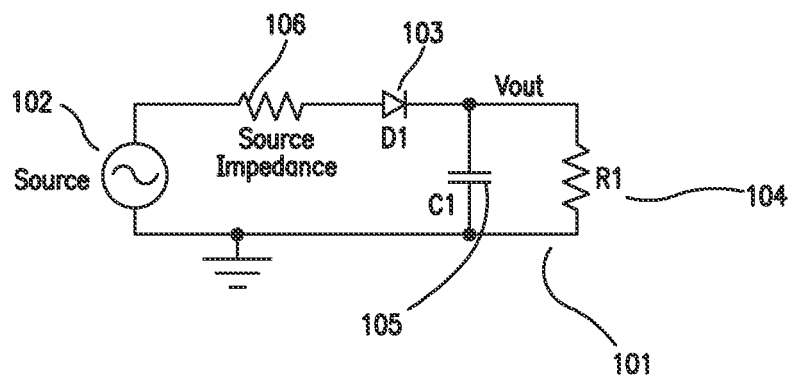
FIG. 1 shows a circuit used to capture the peak voltage of an alternating current (AC) source in the prior art.

As described in the Description of the Related Art section above, the circuit 101 of FIG. 1 has several limitations, including a large voltage drop across the diode 103 which is temperature dependent and a requirement that the internal impedance of the AC source 102 (represented by the impedance 106, for example), be low. In accordance with an example aspect herein, on the other hand, a circuit is provided having a low voltage drop from an output voltage of the AC source 102 as well as a small overall loading on the AC source 102.

Figure 2:
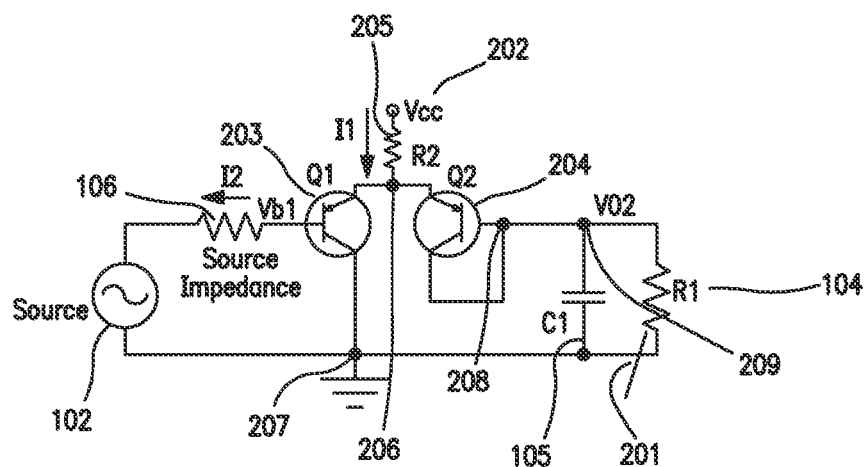
FIG. 2 shows a circuit used to capture the peak voltage of an AC source, according to an example embodiment herein.
Figure 4:
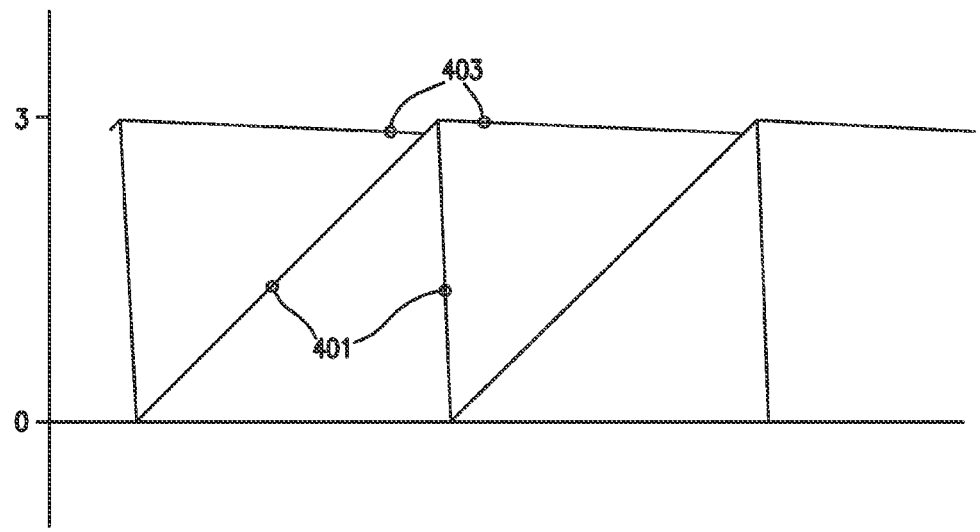
FIG. 4 shows a voltage 401 provided by an AC source and a voltage 403 provided from a capacitor of at least one of the circuits of FIGS. 3 and 4.

FIG. 2 shows a circuit 201 according to an example embodiment herein. As in the circuit 101 in FIG. 1, the circuit 201 includes an AC source 102, a capacitor 105 and a resistor 104. In one example, the AC source 102 provides a voltage 401 varying between zero and +3 volts as shown in FIG. 4, although the voltage need not be referenced to "0" as shown in the example, and also need not be the example values set forth herein. Instead of the diode 103 in FIG. 1, circuit 201 includes a positive supply voltage source 202 which is connected with a resistor 205, which, in turn, is connected with a pair of PNP bipolar junction transistors (BJTs) 203 and 204 through their coupled emitters at a node 206. In one example, the voltage source 102 supplies a voltage of 5 volts, although this example is not exclusive. In another example embodiment, the resistor 205 can be replaced with a current source. Such a current source preferably provides a constant current, independent of the value of the peak voltage output by voltage source 102. For example, as the peak voltage output by source 102 decreases, less peak rectification current is needed, but with resistor 205 being a fixed value, it may supply more current than needed for times when the peak voltage is less than its maximum peak voltage. Thus, use of a current source instead may be deemed suitable in such a situation, although it is not required.

In the illustrated example embodiment, the BJTs 203 and 204 preferably are identical each with a current gain β (although depending on predetermined operating criteria, in other embodiments they do not need to be identical). The base of the BJT 203 is connected with the AC source 102, while the collector of the BJT 203 is connected to ground via a node 207. The base and the collector of the BJT 204 are joined together (and thus BJT 204 behaves as a diode with a forward voltage of about 0.7 volt) at a node 208, which is connected via node 209 with one end of each of the capacitor 105 and resistor 104. The AC source 102, capacitor 105 and resistor 104 are also connected to ground at the other ends thereof.

In one example, the preferred RC time constant of the resistor 104 and the capacitor 105 is large compared to the period of the input AC source 102. This keeps the ripple voltage on the capacitor 105 to an acceptably low value. However, in another example, such as a case where the peak voltage of the AC source 102 slowly varies over many cycles, the RC time constant can be short enough such that the voltage across the capacitor 105 can follow this changing input voltage.

The output current I1 of the resistor 205 is set to be the maximum peak current of the AC source 102 during the rectified peak input voltage. In one example embodiment herein, the peak rectified current is estimated to be that value, assuming that the source impedance 106 is zero and that an ideal diode is used. If the current supplied by element 205 is slightly less than the assumed ideal peak current, then in one example this circuit conducts current to the element 105 slightly longer during the input peak voltage, and the peak output voltage of capacitor 105 is slightly less.

When the base voltage Vb1 of the BJT 203 is approximately less than the base voltage Vb2 of the BJT 204, the base-emitter junction of the BJT 203 becomes forward biased and that of the BJT 204 becomes reverse biased (the BJT 204 turns off). A small current I2 equal to I1/β then flows back towards the AC source 102 through the base of the BJT 203. When the voltage Vb1 is equal to the voltage Vb2, the current I1 generally gets split evenly between the BJTs 203 and 204. When the voltage Vb1 is greater than the voltage Vb2 or approximately exceeds it, the base-emitter junction of the BJT 203 becomes reverse biased (the BJT 203 turns off) and that of the BJT 204 becomes forward biased. As a result, essentially the entire current I1 is then provided to the "diode-connected" BJT 204 and used to charge the capacitor 105.

In one example embodiment, the off-to-on voltage ratio of a BJT (i.e, the ratio of the base voltage at 5% of the peak current from the emitter to the base voltage at 95% of the peak current from the emitter) is about 75 mV, and thus an absolute difference between Vb1 and Vb2 of at least 75 mV causes the current I1 to go in largely one of the two directions described above. For example, as voltage Vb1 rises above Vb2 by about only 75 mV, 95% or essentially the entire current current I1 is used to charge the capacitor 105. Thus, in one example the dual transistor configuration behaves like a diode having a voltage drop of nominally 0 volts and an off-to-on voltage of only about 150 mV (as compared with a normal diode that has an ON voltage of 0.7 volts and an OFF voltage (where current has dropped to just 5%) which is about a 75 mV drop.

As can be appreciated in view of FIG. 2, a voltage supplied by the AC source 102 can be reduced somewhat as result of the source impedance 106 to Vb1. When the output of the AC source 102 is such that Vb1 is greater than Vb2, then as described above essentially the entire current I1 is used to charge the capacitor 105. When the output of the AC source 102 is such that Vb1 is less than Vb2 and the BJT 204 turns off, a small current flows back to the AC source 102 while the capacitor 105 discharges to the resistor 104. In this manner, the resistor 104 discharges the capacitor 105 between the peak voltages represented by voltage 401 in FIG. 4. The capacitor 105 outputs to resistor 104 a DC voltage (which may have a small amount of ripple) 403 such as in the example represented in FIG. 4, and thus the circuit 201 rectifies the output voltage 401 of the AC source 102 in a manner so as to capture the peak of that voltage 401. In other words, when the BJT 203 is off and the BJT 204 is on, the current I1 is used ("shunted") to charge the capacitor 105 during the peak of the voltage 401 output by AC source 102 (e.g., during 5% to 10% of the period of that voltage), thereby enabling the circuit 201 to "capture" the peak of that voltage 401 (whereas at other times, such as when the BJT 203 is on and the BJT 204 is off, that current I1 is "shunted to" ground).

While the BJTs 203 and 204 each have an emitter-base voltage of about 0.7V, these voltages tend to cancel each other out because the BJTs 203 and 204 are identical. Therefore, the sum voltage drop across the pair of BJTs 203 and 204 is essentially zero, as opposed to the voltage drop across the diode 103 in FIG. 1 being a nominal 0.7V. Therefore, the BJTs 203 and 204 behave as a diode but with a voltage drop of nominally zero. In addition, owing to the presence of the voltage source 202 and the manner in which current flows from the voltage source 202 to the BJTs 203 and 204, as discussed above, the capacitor 105 can remain charged at least until it captures the peak output voltage 401 of the AC source 102. While the BJTs 203 and 204 in one example embodiment each may have a temperature coefficient of −2 mv/° C. or similar values, the temperature dependencies similarly tend to cancel each other, thereby minimizing or substantially avoiding temperature-sensitivity of the circuit.

Furthermore, since the current gain β is of the order of 50 to 100, the small current that flows through the base of the BJT 203 when the voltage Vb1 is less than the voltage Vb2 is only 1% or 2% of the peak rectified current that is drawn by the diode 103 in FIG. 1. The pair of BJTs 203 and 204 therefore causes a smaller loading effect than does the diode 103. For example, in the case of FIG. 1, all of the peak current that charges capacitor 105 must come from the source 102, and a large voltage drop is experienced through source impedance 106. As a result, the rectified voltage across capacitor 105 is reduced by the amount of voltage drop across impedance 106, and capacitor 105 thus does not capture the true peak voltage of the source 102. Owing to the configuration of FIG. 2, on the other hand, in which VCC source 202 is used to provide peak rectification current I1 for charging capacitor 105 during the peak voltage of source 102, the circuit 201 draws only about 1% or 2% of the peak rectified current, and thus the voltage drop owing to the impedance 106 is a factor of about 50 to 100 less than that in the case of the FIG. 1 circuit. Hence, the circuit of FIG. 2 suffers essentially no penalty in the voltage output at node 209, for example, from losses in source impedance 106, even in cases where that impedance 106 may be high.

Therefore, this embodiment provides a circuit 201 where capacitor 105 largely tracks the positive voltage peaks of AC source 102 to provide a corresponding DC, rectified voltage, and is able to capture the peak voltage of the voltage source 102, without much loading on the voltage source 102, as compared to the case of the circuit 101 of FIG. 1.

As can be appreciated in view of the above description, the BJTs 203 and 204 of the circuit 201 described above preferably operate such that, other than during a small transition region in which both devices may be "on" at the same time, at other times only one of those BJTs is "on" (and operating in a linear region) at a time while the other BJT is "off". This feature is unlike at least some conventional devices having transistors connected at their emitters, because in such devices both transistors typically operate continuously in a linear region.

Because the transistor 204 operates as a "diode-connected" transistor, in another example embodiment that transistor 204 can be replaced with a diode that preferably has a substantially similar voltage drop as does the BJT 203. In that example, an input of the diode is connected to node 206, and an output of the diode is connected to node 208.

Figure 3:
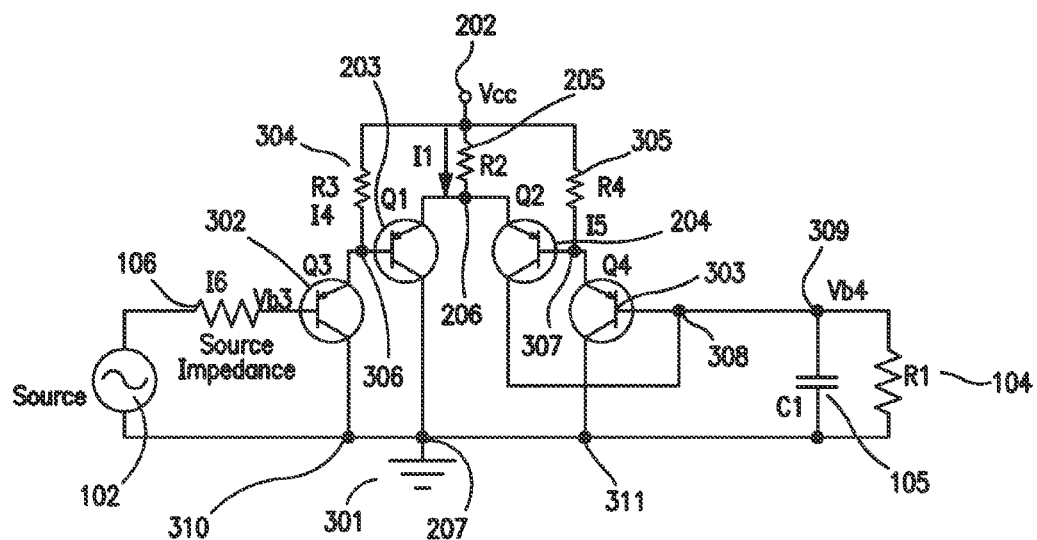
FIG. 3 shows a circuit used to capture the peak voltage of an AC source, according to another example embodiment herein.

Referring now to FIG. 3, a circuit 301 according to another example embodiment herein will now be described. As in the circuit 201 in FIG. 2, there are an AC source 102, a capacitor 105, a resistor 104, a positive-supply voltage source 202, a resistor (or current source) 205, and PNP BJTs 203 and 204. Circuit 301 also includes resistors 304 and 305 and PNP BJTs 302 and 303. The resistors 304 and 305, in one example, have substantially equal resistance values, and are selected to provide a smaller current (in one example, 10% to 20% of I1) than that provided through resistor 205. This arrangement maintains BJTs 302 and 303 on at all times, and thus, in one example, does not significantly increase, if at all, the approximate 150 mV off-to-on characteristic of BJTs 203 and 204. Like resistor 205, the resistors 304 and 305 can also be current sources instead.

In one example, two or more of the BJTs 203, 204, 302 and 303 are identical each with a current gain β, although they do not have to be identical. Preferably, the BJTs 203 and 204 (referred to for convenience as a "first pair") are identical with one another, and the BJTs 302 and 303 (referred to for convenience as a "second pair") are identical with one another, but the BJTs of the first pair need not be identical with the BJTs of the second pair. The BJTs of the second pair can be smaller than those of the first pair, in one example.

The resistor 304 is connected with the pair of BJTs 203 and 302 via a node 306, where the base of the BJT 203 and the emitter of the BJT 302 are connected with each other via node 306. The collector of the BJT 203 is connected to ground via node 207 as in FIG. 2. The base of the BJT 302 is connected with the AC source 102, and the collector of the BJT 302 is connected to ground via a node 310. Similarly, the resistor 305 is connected with the pair of BJTs 204 and 303 via a node 307, where the base of the BJT 204 and the emitter of the BJT 303 are connected with each other via node 307. The collector of the BJT 204 and base of the BJT 303 are connected together at a node 308, which is connected via a node 309 with one end of each of capacitor 105 and resistor 104. The collector of the BJT 303 is connected to ground via a node 311. The resistor 104 and capacitor 105 also are connected at other ends thereof to ground, as in FIG. 2. Also, the resistors 304, 205 and 305 are connected to Vcc source 202.

The output current I1 of the resistor 205 is set to be the maximum peak current of the AC source 102 during the rectified peak input voltage. The output current I4 of the resistor 304 and the output current I5 of the resistor 305 are each set to be between 10% and 20% of the current I1. Because the BJTs 302 and 203 have a collector commonly connected to ground, the base-emitter junction of the BJT 302 is always forward biased. The output current I5 is set to also keep the base-emitter junction of the BJT 303 forward biased. When the base voltage Vb3 of the BJT 302 is less than the base voltage Vb4 of the BJT 303, the base-emitter junction of the BJT 203 becomes forward biased and that of the BJT 204 becomes reverse biased (the BJT 204 turns off). As a result, BJTs 302 and 203 are both on, and BJT 303 also is on. Therefore, a small current I6 equal to $(I1/\beta/\beta + I4/\beta)$ flows back through the base of the BJT 302 back to the AC source 102 (that current is smaller than current which may flow back to source 102 in FIG. 2). When the voltage Vb3 is equal to the voltage Vb4, all BJTs 302, 203, 204, and 303 are on, and the current I1 generally gets split evenly between the BJTs 203 and 204. As voltage Vb3 continues to rise by, for example, another 75 mV (and is greater than voltage Vb4) the base-emitter junction of the BJT 203 becomes reverse biased such that BJT 203 turns off, and the BJT 204 becomes forward biased. Therefore, essentially the entire current I1 is provided to the BJT 204 and that current plus current I5 are provided to the base of the BJT 303 to charge the capacitor 105.

As can be appreciated in view of FIG. 3, a voltage supplied by the AC source 102 is reduced somewhat as result of the source impedance 106 to Vb3. When the output of the AC source 102 is such that Vb3 is approximately greater than Vb4, then as described above essentially the entire current I1 is used to charge the capacitor 105. When the output of the AC source 102 is such that Vb3 is approximately less than Vb4 and the BJT 204 turns off, a small current flows back to the AC source 102 and the capacitor 105 discharges to the resistor 104. In this manner, the resistor 104 discharges the capacitor 105 between the peak voltages represented by voltage 401 in FIG. 4. The capacitor 105 outputs to resistor 104 a DC voltage (which may have a small amount of ripple) 403 such as in the example represented in FIG. 4, and thus the circuit 301 rectifies the output voltage 401 of the AC source 102 in a manner so as to capture the peak of that voltage 401. In other words, when the BJT 203 is off and the BJT 204 is on, the current I1 is used to charge the capacitor 105 during the peak of the voltage 401 output by AC source 102 (e.g., during 5% to 10% of the period of that voltage), thereby enabling the circuit 301 to "capture" the peak of that voltage.

Since the BJTs 302 and 303 preferably are always on, the circuit 301 does not suffer additional losses from their off-to-on voltage ratios on top of the normal off-to-on losses of the BJTs 203 and 204. Preferably, to minimize loading on the source 102, the BJTs 302 and 303 do not carry too much current which can cause loading. In one example embodiment, the off-to-on voltage ratio of each of the BJTs 203 and 204 is about 75 mV, and thus an absolute difference between Vb3 and Vb4 of at least 75 mV causes the current I1 to go in largely one of the two directions in a similar manner as described above.

The base-emitter voltages of the first pair of BJTs 302 and 203 and the second pair of BJTs 204 and 303 tend to cancel each other out because the BJTs 203 and 204 are identical, and the BJTs 302 and 303 are identical. Therefore, the sum of the voltage drops across the first pair of BJTs 302 and 203 and the second pair of BJTs 204 and 303 is essentially zero. In addition, owing to the presence of the voltage source 202 and the manner in which the current flows from the voltage source 202 to the two pairs of BJTs, as discussed above, the capacitor 105 can remain charged until it captures the peak positive output voltage of the AC source 102. In one example embodiment, the BJTs 203, 204, 302 and 303 (or the BJTs from a same pair) each have a same temperature coefficient, and, as a result, the temperature dependencies similarly tend to cancel each other, thereby minimizing or substantially avoiding temperature sensitivity of the circuit. Furthermore, the circuit 301 of FIG. 3 operates substantially similarly as the circuit 201 of FIG. 2, although the circuit 301 presents even less loading to the source 102 than does circuit 201. That is because the base current from the BJT 302 that flows back to the AC source 102 is even smaller than the current that flows back from the base 203 in this circuit 301 and in the circuit 201. The first pair of BJTs 302 and 203 and the second pair of BJTs 204 and 303 therefore cause an even smaller loading effect than the single pair of BJTs 203 and 204 of FIG. 2. Owing to the presence of BJT 302, any current that may flow back towards the source 102 is reduced relative to, for example, that in the circuit of FIG. 2, thereby enabling the circuit 301 of FIG. 3 to provide a more accurate representation of the peak voltage via capacitor 105.

Moreover, whereas the BJTs 203 and 204 operate from full on-to-off, the BJTs 302 and 303 always remain ON and hence there is very little change in their Vbe's during rectification. Moreover, since there are many transistors in the circuit 301 of FIG. 3, that circuit is well suited for an integrated circuit, rather than separate discrete transistors, although it can be either. In an integrated circuit in at least some cases, it can be easier to assure that the transistors are identical and that the temperature of all transistors is the same.

In one example, at least part of the circuit 301 behaves like a diode having a voltage drop of nominally 0 volts and an off-to-on voltage of only about 150 mV (as compared with a normal diode that has an ON voltage of 0.7 volts and an OFF voltage of about a 75 mV drop).

As for the circuit 201 of FIG. 2, because the transistor 204 of FIG. 3 operates as a diode-connected transistor, in another example embodiment that transistor 204 can be replaced with a diode that preferably has a substantially similar voltage drop as does the BJT 203. In this example, an input of the diode is connected to node 206, and an output of the diode is connected to node 308.

Although the above description is described in the context of employing BJT-type transistors, in other embodiments other types of transistors may be employed to carry out the overall functionalities described herein.

In the above descriptions, various aspects of the invention have been described with reference to specific example embodiments. The specification and drawings are accordingly to be regarded in an illustrative rather than in a restrictive sense. It will, however, be evident that various modifications and changes may be made without departing from the broader spirit and scope of the present invention.

In addition, it should be understood that the figures illustrated in the attachments, which highlight the functionality and advantages of the present invention, are presented for example purposes only. The architecture of the example aspect of the present invention is sufficiently flexible and configurable such that it may be utilized (and navigated) in ways other than that shown in the accompanying figures.

Although example aspects of this invention have been described in certain specific embodiments, many additional modifications and variations would be apparent to those skilled in the art. It is therefore to be understood that this invention may be practiced otherwise than as specifically described. Thus, the present example embodiments, again, should be considered in all respects as illustrative and not restrictive.

What is claimed:

1. A voltage rectifier circuit comprising:
   a storage element; and
   a switching stage that is switchable to enable the storage element to capture a peak voltage of an alternating power source,
   wherein the switching stage includes a plurality of PNP transistors,
   wherein emitters of a first one and a second one of the PNP transistors are directly connected to each other and are further connected to a voltage source distinct from the alternating power source.

2. The voltage rectifier circuit according to claim 1, wherein a base of the first one of the PNP transistors is connected with the alternating power source.

3. The voltage rectifier circuit according to claim 1, further comprising a resistor connected in parallel with the storage element.

4. The voltage rectifier circuit according to claim 3, wherein a base and a collector of one of the PNP transistors are connected with the storage element and the resistor.

5. The voltage rectifier circuit according to claim 1, wherein an output current of one the PNP transistors is set to be a peak current of the alternating power source.

6. The voltage rectifier circuit according to claim 1, wherein the PNP transistors are substantially identical.

7. The voltage rectifier circuit according to claim 1, wherein the plurality of PNP transistors include at least four PNP transistors.

8. The voltage rectifier circuit according to claim 7, wherein a base of a third one of the PNP transistors is connected with the alternating power source.

9. The voltage rectifier circuit according to claim 7, wherein an output current of one of the PNP transistors is set to be a peak current of the alternating power source.

10. The voltage rectifier circuit accordingly to claim 7, wherein, among four of the PNP transistors, PNP transistors of a first pair of the four PNP transistors are substantially identical with one another, and PNP transistors of a second pair of the four PNP transistors are substantially identical with one another.

11. The voltage rectifier circuit according to claim 1, wherein at least one of temperature coefficients and voltage drops across the PNP transistors essentially cancel out.

12. The voltage rectifier circuit according to claim 1, wherein the storage element is a capacitor.

13. The voltage rectifier circuit accordingly to claim 1, wherein a base of one of the two PNP transistors is connected with an emitter of a further one of the PNP transistors.

14. The voltage rectifier circuit accordingly to claim 1, wherein the circuit provides minimal loading on the alternating power source.

15. The voltage rectifier circuit according to claim 1, wherein the switching stage includes PNP transistors arranged in a back-to-back configuration.

16. A voltage rectifier circuit comprising:
a storage element; and
a switching stage that is switchable to enable the storage element to capture a peak voltage of an alternating power source,
wherein the switching stage includes a plurality of PNP transistors, and
wherein a base and a collector of a first one of the PNP transistors are directly connected together.

17. The voltage rectifier circuit according to claim 16, wherein a base of a second one of the PNP transistors is connected with the alternating power source.

18. The voltage rectifier circuit according to claim 16, wherein emitters of at least two of the PNP transistors are directly connected together.

19. The voltage rectifier circuit according to claim 16, further comprising a resistor connected in parallel with the storage element.

20. The voltage rectifier circuit according to claim 19, wherein a base and a collector of one of the PNP transistors are connected with the storage element and the resistor.

21. The voltage rectifier circuit according to claim 16, wherein an output current of one the PNP transistors is set to be a peak current of the alternating power source.

22. A voltage rectifier circuit comprising:
a storage element; and
a switching stage that is switchable to enable the storage element to capture a peak voltage of an alternating power source,
wherein an output current of one of the transistors is set to be a peak current of the alternating power source and,
wherein an output current of at least another of the transistors is set to be between 10% and 20% of the output current of the one of the transistors.

23. A voltage rectifier circuit comprising:
a storage element; and
a switching stage that is switchable to enable the storage element to capture a peak voltage of an alternating power source,
wherein the switching stage includes bipolar junction transistors,
wherein a base of a first one of the bipolar junction transistors is connected with the alternating power source, and
wherein a base and a collector of a second of the bipolar junction transistors are directly connected together, such that the second of the bipolar junction transistors behaves as a diode with a forward voltage of about 0.7 volts.

* * * * *